Oct. 18, 1960   R. M. C. GREENIDGE ET AL   2,957,038
PLUGGING OF PLASTIC INSULATED CABLE
Filed March 2, 1959   3 Sheets-Sheet 1
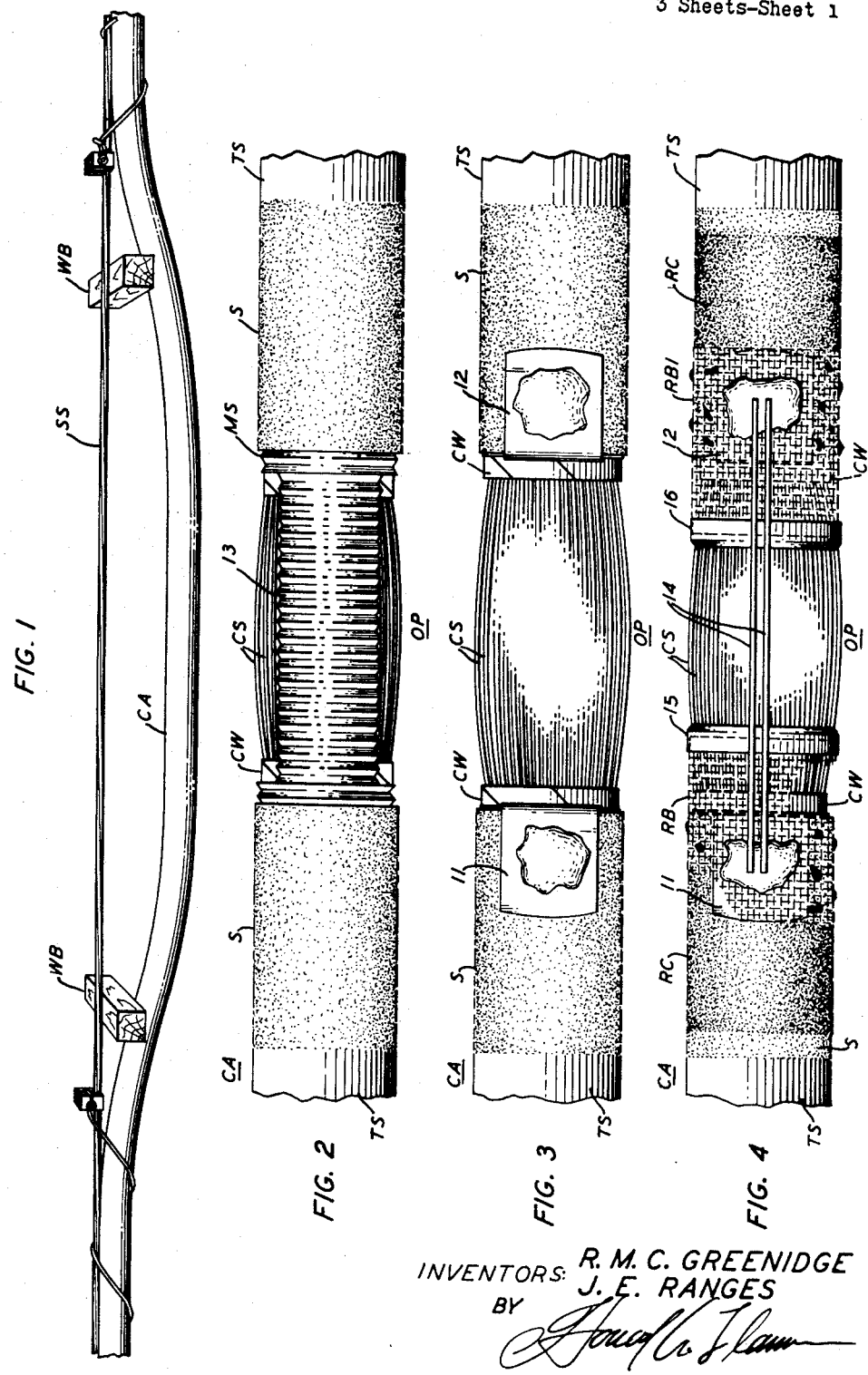
INVENTORS: R. M. C. GREENIDGE
J. E. RANGES
BY
ATTORNEY

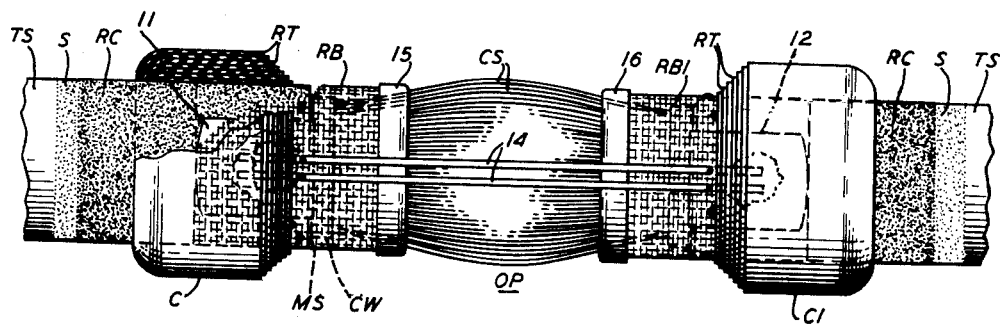
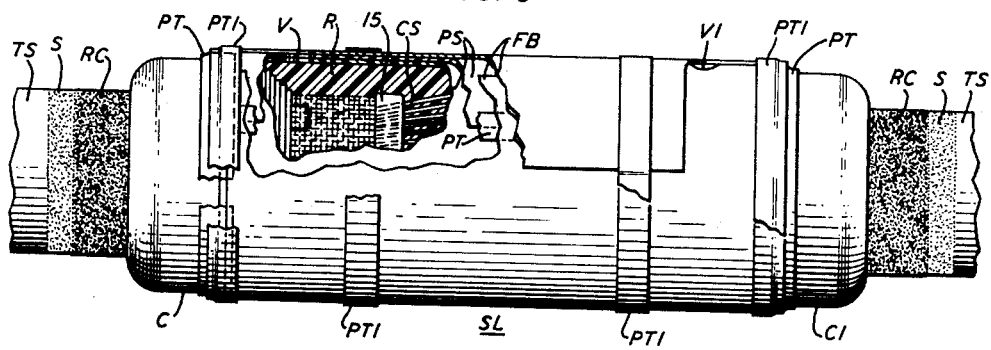
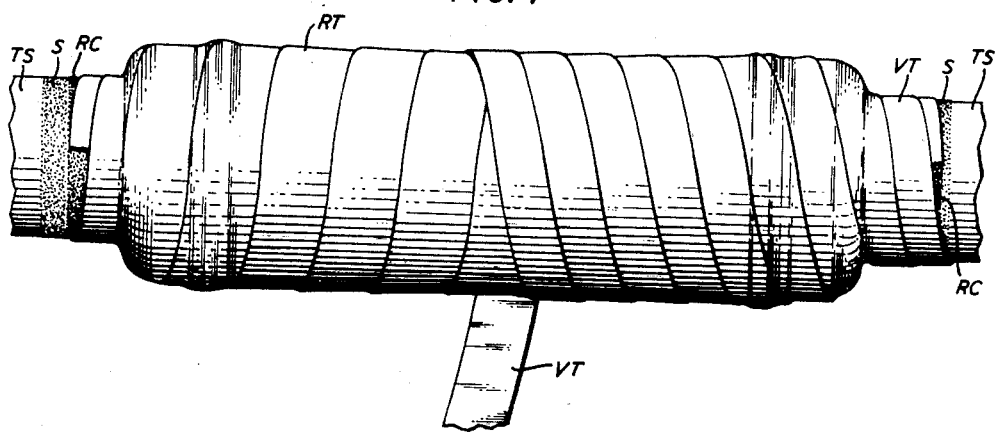

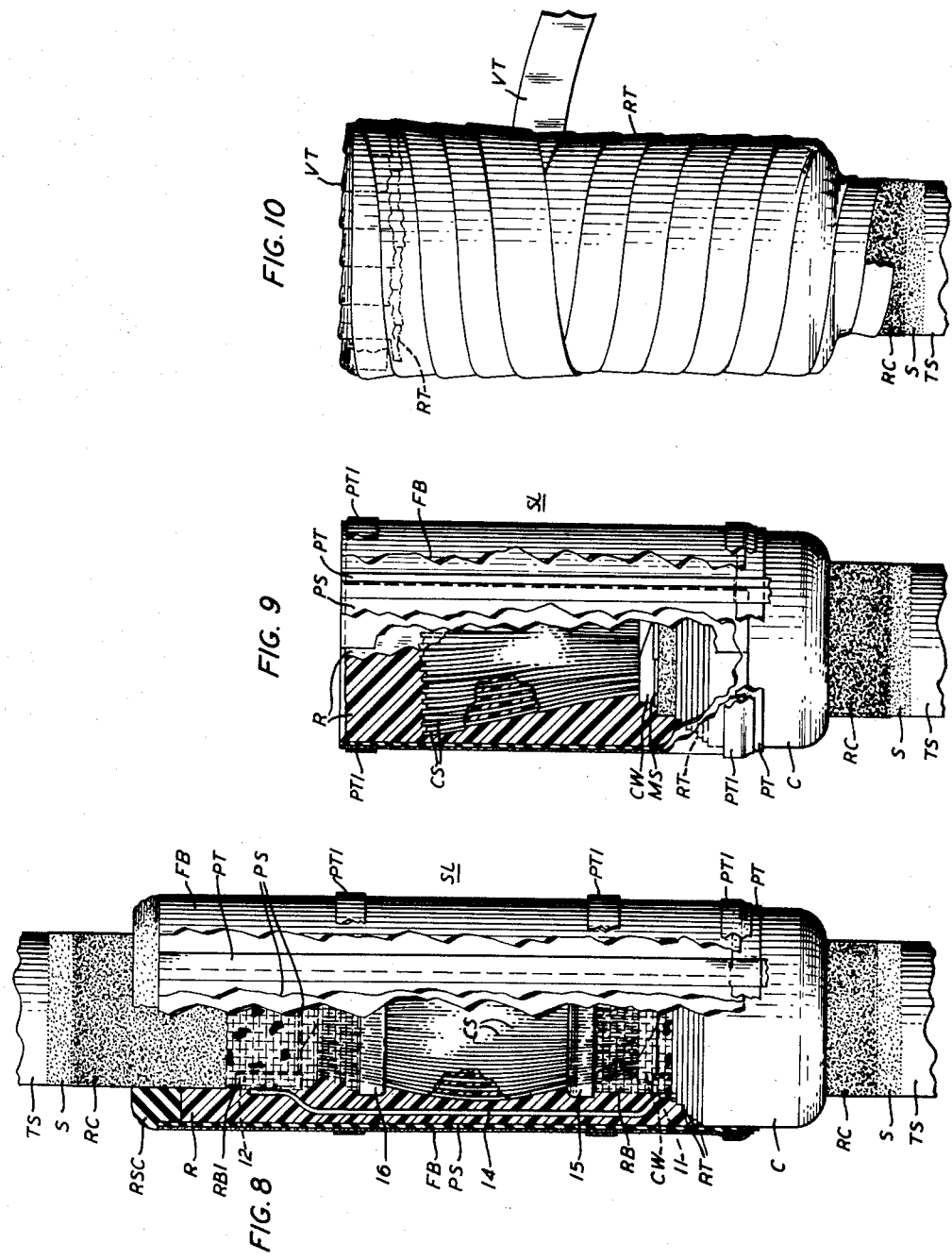

United States Patent Office

2,957,038
Patented Oct. 18, 1960

2,957,038

PLUGGING OF PLASTIC INSULATED CABLE

Ralph M. C. Greenidge, Chatham, and John E. Ranges, East Rutherford, N.J., assignors to Bell Telephone Laboratories, Incorporated, New York, N.Y., a corporation of New York Filed Mar. 2, 1959, Ser. No. 796,310

4 Claims. (Cl. 174—23)

This invention relates to methods and means for sectionalizing communication or similar cables which comprise a plurality of insulated conductors enclosed in a gas-tight sheath.

More particularly, this invention relates to methods of producing plugs of a type intended for use with the above-mentioned cables, which may be installed aerially or underground.

In contrast with previous methods of plugging paper-insulated lead-covered cables or plastic sheathed cable wherein a cold resin is applied by pressure to completely fill the interstices between the conductors and adhere to the conductors to form a rubbery seal, the present invention provides methods and means whereby the plugging of gas-tight sheathed cables is accomplished by pouring cold-setting resin into a vented sleeve encompassing an exposed section of the inner conductors.

A principal object of our invention is to provide methods and means for constructing plugs of various forms that are easy to produce in the field or shop and will function satisfactorily when made and used for sectionalizing gas-tight sheathed cables at suitably spaced intervals and for plugging the ends of similar sheathed cables positioned either horizontally or vertically.

A further object is to provide plugs of a type suitable for maintaining a continuous gas pressure of ten pounds to the square inch indefinitely over a wide temperature range, and also capable of withstanding external pressures of moisture, water or gas.

A particular feature of the invention pertains to the provision of plugs of the type adapted for the purposes described hereinabove by the formation of a plastic resin dam which spans an opening in the cable and completely envelops the conductors.

Another feature of the invention pertains to the establishment of a compression seal around each of the conductors and the cable sheath, resulting from the shrinkage of the cold-setting resin dam during the setting thereof into a flexible gas-tight seal.

Another feature of this invention is the means provided for maintaining the electrical continuity of the inner metal sheath.

The invention and the features thereof will be more clearly understood from the following detailed description when read with the accompanying drawings, in which:

Fig. 1 is an elevational view, and illustrates by the way of example, a length of thermoplastic sheathed cable aerially supported, and shows a portion thereof suitably spaced away from the supporting strand by wooden blocks, an initial step in the preparation for constructing a horizontal plug;

Fig. 2 is a fragmentary side elevational view, in enlarged scale, of the spaced section of cable shown in Fig. 1, having an opening formed therein by removing the thermoplastic sheath, parts of the metal sheath, and core wrap; also shown are portions of the outer sheath scuffed and the exposed conductors ballooned;

Fig. 3 is a view similar to Fig. 2 and shows the first step in an alternate arrangement of the metal sheath for preserving the electrical continuity thereof;

Fig. 4 is a view similar to Fig. 3 and shows additional structure, such as the reinforcing bands imbedded in the thermoplastic sheath, bridging wires for establishing the continuity of the metal sheath, and coatings of suitable cement applied to the scuffed surfaces;

Fig. 5 is a view similar to Fig. 4 and shows the addition of rubber collars bonded to the cement-coated surfaces of the bands and sheath ends;

Fig. 6 is a fragmentary elevational view of a completed horizontal plug partly broken away to show the construction of the sleeve for confining the resin as it is introduced therein;

Fig. 7 shows protective wrappings of rubber and vinyl tapes applied in reverse directions to the embodiment shown in Fig. 6 as a final step;

Fig. 8 illustrates partly in section, a fragment of a cable having incorporated therein a completed vertical plug. This construction is similar to that shown in Fig. 6 except for modifications in the sleeve and the method of sealing the open end thereof;

Fig. 9 illustrates partly in section the construction of an end plug for sealing the inner conductors and sheath ends at the stub end of thermoplastic sheathed cables; and Fig. 10 shows protective wrappings of rubber and vinyl tape applied in a reverse direction to the embodiment shown in Fig. 9.

By reference to the drawings, the method of producing cable plugs in accordance with the structures depicted will now be described.

In the preparation as shown in Fig. 1, for constructing a horizontal plug, a section of aerial cable such as CA is first detached from its supporting strand SS and then held suitably spaced therefrom by placing the wooden blocks WB—WB as shown.

After the cable has been prepared as described above, an opening OP, shown in Fig. 2, is next formed in the cable section CA to expose the conductors CS. Opening OP is formed by removing first a substantial length of the thermoplastic sheath TS, which is ordinarily formed of polyethylene, and then a major portion of the metal sheath MS, commonly aluminum, and paper core wrap CW. By removing the metal sheath MS as described above, a strip 13 remains intact for preserving the electrical continuity of said sheath. Next, as shown in Fig. 2, portions of the thermoplastic sheath TS—TS, adjacent the opening OP, are scuffed as at S—S and the exposed conductors CS ballooned for preparing the seal of this invention, which hereinafter will be described in detail.

Shown in Fig. 3, as part of an alternate construction for preserving the electrical continuity of the metal sheath MS, tabs 11 and 12 are formed from the strip 13 heretofore described. The tabs are prepared smooth and then folded back upon the thermoplastic sheath ends whereupon they are next tinned with solder for securing, later on in the construction, the reinforcing bands RB and RB1 and the bonding wires 14—14 as shown in Fig. 4.

After preparing the metal sheath MS, in accordance with either Fig. 2 or Fig. 3, reinforcing bands RB and RB1 comprising strips of metallic cloth are positioned around the exposed conductors CS and portions of the thermoplastic sheath TS—TS adjacent the opening OP, as shown in Fig. 4. The oppositely disposed edges of the reinforcing bands RB and RB1 are covered with strips of folded rubber tape 15 and 16, respectively, to protect the insulation on conductors CS from mechanical penetration and short circuiting. Next, heat is applied by means of a soldering iron, or any other suitable means, to a number of points around the reinforcing bands RB and RB1 so that they are firmly imbedded in the thermoplastic sheath TS—TS as shown in Fig. 4.

After completing the above steps, when the preparation of the metal sheath was in accordance with Fig. 3, two lengths of wire 14—14, suitable for spanning the opening OP, are soldered to the reinforcing bands RB and RB1 and also onto the metal tabs 11 and 12 as shown in Fig. 4, to complete the alternate construction which heretofore was described for preserving the electrical continuity of the metal sheath MS.

As a next step, also shown in Fig. 4, coatings of rubber cement RC—RC are applied around the imbedded portions of the reinforcing bands RB and RB1 and also portions of the scuffed surfaces S—S for bonding the collars C and C1 disclosed in Fig. 5.

After the coatings RC—RC have become tacky, then stepped layers of suitable tape RT as shown in Fig. 5, are applied to provide the collars C and C1, which are positioned respectively on the reinforcing bands RB and RB1, and serve to support the sleeve SL and confine the resin which has an affinity for the collars and provide a compression seal between the collar and scuffed sheath. Next, as shown in Fig. 6, the sleeve SL having vents V and V1, is constructed on the collars C and C1 to provide a form suitable for confining the resin R shown therein. The construction of the sleeve SL is accomplished by wrapping separately a layer of flexible resilient insulating sheet, which will not restrict the shrinkage of the resin, for example, polyethylene sheeting PS and an outer layer of reinforcing non-resilient flexible materials such as fiberboard FB around the collars C and C1 and securing them by the tapes PT and PT1 as shown.

The use of a resilient material, such as polyethylene, as the sleeving, is very significant in the successful practising of the invention. As discussed below, the shrinkage of the resin is important in establishing a compressive seal with the sheath and the wire insulation. If a sleeve is used to which the resin bonds but which is incapable of substantial longitudinal compression, the decrease in surface area of the body of resin as it shrinks will cause the creation of tensile stresses in the resin sufficient to produce longitudinal fissures in the resin body. Such fissures occur, for example, when paper, or fiber metal sleeves are used in direct contact with the resin. On the other hand, polyethylene sleeves have properties which permit the contraction of the resin without the occurrence of cracking of this type.

A resin composition is used which is a pourable liquid at ordinary temperatures but which is capable of spontaneously setting, without heating, after a period of time to form an infusible body, which resin also shrinks upon setting and forms a gas-tight bond with the wire insulation and the thermoplastic sheath. The liquid resin is poured into one of the vents V and V1 while the air escapes from the other.

The most suitable resin compositions for this purpose are those with an epoxy resin base. Thus, the commercially available epoxy resins mixed with common setting agents, such as organic amine hardeners, can be used. However, it is ordinarily more desirable to use a mixture of an epoxy resin with an active modifying ingredient, particularly with a long chain amide. A particularly suitable amide of this type is the reaction product of fatty acid and an amine, sold commercially under the name of "Lancast." A mixture of 70 parts of epoxy resin with 30 parts of this amide and 5 parts of an amine hardener has been found to give excellent results.

The component ingredients are ordinarily mixed just prior to pouring into the sleeve since setting of the resin occurs, without external heating, within about an hour.

After the epoxy resin R, confined in sleeve SL, has hardened, then the reverse wrapping of rubber tape RT and vinyl tape VT shown in Fig. 7, are applied over the entire construction of the plug as a protective coat.

When it is desired to plug a section of vertical run cable, it is necessary to introduce the epoxy resin at the top of the sleeve. In the construction shown in Fig. 8, for a vertical plug, the inner structure is substantially the same as that shown in Fig. 6 except for minor modifications. The sleeve SL shown has no vents and is arranged open at its top for the introduction of the epoxy resin R. After the epoxy resin R has hardened, then rubber sealing compound RSC is applied at the top of the plug as shown. Next, as a final step, reverse wrappings of rubber tape RT and vinyl tape VT, are applied over the entire structure as shown in Fig. 7.

In Fig. 9 construction is shown for plugging the end of a thermoplastic sheathed cable stub. This construction is substantially the same as the structure shown in Fig. 8 for plugging a vertical section of cable, except for the elimination of the metal bands, and the means provided for preserving the electrical continuity of the metal sheath MS, and the inclusion of means for sealing the end of the cable stub.

One of the final steps in the construction of the plug as shown in Fig. 9, is the application of overlapping strips of suitable material, such as heretofore described, over the end of the cable stub. Subsequently, the plug is completed by applying the wrappings of rubber tape RT and vinyl tape VT in reverse directions for a protecting coat.

While we have shown and described herein the preferred embodiments of our invention, it is to be understood that various modifications and changes may be made therein without departing from the spirit of the invention and we are only limited by the scope of the appended claims.

What is claimed is:

1. The combination in a cable plug for sectionalizing a horizontal length of thermoplastic sheathed cable having a plurality of individually insulated conductors encased in a metal sheath underlying said thermoplastic sheath, said combination including an opening provided by the removal of a portion of said thermoplastic sheath and said metal sheath, a portion of said metal sheath remaining intact for preserving the electrical continuity thereof, a perforated metal band secured around each end of said thermoplastic sheath adjacent said opening, collars bonded to said metal bands and to portions of said thermoplastic sheath, a flexible sleeve secured around said collars, a filling of hardened liquid resin introduced into said sleeve to fill the voids between the insulated conductors and the space between said conductors and said sleeve, and protective wrappings applied over the entire structure.

2. The method of making a plug for sectionalizing a horizontal length of gas-tight sheathed cable, adapted to be maintained under pressure, having a plurality of individually insulated conductors encased in a metal sheath underlying said thermoplastic sheath, said method comprising the following steps; removing a substantial portion of said plastic sheath to provide an opening therein, removing a part of said metal sheath to expose the conductors, leaving intact a portion of said metal sheath to preserve the electrical continuity thereof, ballooning said conductors, applying perforated metal bands around the ends of said thermoplastic sheath adjacent said opening, applying heat to said bands, bonding a collar to each of said bands and to a portion of said sheath, securing a sleeve around said collars, filling said sleeve with a spontaneously hardenable liquid resinous composition comprising an epoxy resin, and subsequently applying protective wrappings around the entire structure of the plug after the hardening of said resin.

3. The combination in a cable plug for sectionalizing a length of vertically positioned gas-tight sheathed cable, having a plurality of individually insulated conductors encased in a metal sheath underlying said thermoplastic sheath, said combination including an opening provided by the removal of a portion of said thermoplastic sheath, and said metal sheath, tab members provided by the partial removal of said metal sheath, a perforated metal band positioned over each of said tabs and imbedded into said thermoplastic sheath, a collar bonded to one of said metal bands and to a portion of said thermoplastic sheath, bonding wires secured to said metal bands and to said tabs for preserving the electrical continuity of said metal sheath, a sleeve secured to said collar and arranged open at the top end thereof, a filling of epoxy resin composition, introduced into said sleeve to fill the voids between the insulated conductors and the space between said conductors and said sleeve, and protective wrappings applied around the entire structure.

4. A method of making a plug for sectionalizing a vertical length of gas-tight sheathed cable, adapted to be maintained under pressure, having a plurality of individually insulated conductors encased in a metal sheath underlying said thermoplastic sheath, said method comprising the following steps; removing a substantial portion of said plastic sheath and a part of said metal sheath to expose the conductors, forming tabs from the remaining portion of said metal sheath, ballooning said conductors, applying perforated metal bands over said metal tabs and around said thermoplastic sheath, bonding a collar to one of said metal bands and to a portion of the plastic sheath adjacent thereto, securing a sleeve around said collar, filling said sleeve with a hardenable liquid epoxy resin composition, applying a sealing compound at the top end of said sleeve and protective wrappings around the entire structure after the hardening of said epoxy resin composition.

References Cited in the file of this patent

UNITED STATES PATENTS

| | | |
|---|---|---|
| 488,027 | Purcell | Dec. 13, 1892 |
| 1,229,995 | Mainer | June 12, 1917 |
| 2,688,651 | Blake | Sept. 7, 1954 |
| 2,737,543 | Irwin | Mar. 6, 1956 |

FOREIGN PATENTS

| | | |
|---|---|---|
| 721,663 | Great Britain | Jan. 12, 1955 |
| 765,082 | Great Britain | Jan. 2, 1957 |
| 774,593 | Great Britain | May 15, 1957 |